United States Patent Office 3,399,240
Patented Aug. 27, 1968

3,399,240
NITROFLUORO ETHERS AND METHODS
OF PREPARATION
Milton B. Frankel, Menlo Park, Calif., assignor to Aerojet-General Corporation, Azusa, Calif., a corporation of Ohio
No Drawing. Filed Nov. 26, 1963, Ser. No. 326,284
9 Claims. (Cl. 260—614)

This invention relates to certain novel nitro compounds and their method of preparation.

It is an object of this invention to prepare certain novel organic ethers. It is still another object of this invention to prepare new nitro compounds in a novel manner. These and other objects of this invention will be apparent from the detailed description which follows.

The novel ether compounds of this invention have the following general formula (I) 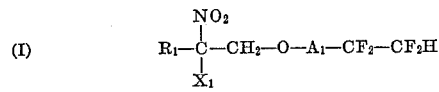

wherein $A_1$ is a lower alkylene group preferably having from 1 to about 6 carbon atoms such as methylene, ethylene, butylene and hexamethylene; $R_1$ is a lower alkyl group preferably having from 1 to about 6 carbon atoms such as methyl, ethyl, butyl and hexyl; and $X_1$ is hydrogen or nitro. $R_1$ and $A_1$ may be branched or straight chain.

Illustrative of the compounds defined by Formula I are 2-nitropropyl-2,2,3,3-tetrafluoropropyl ether; 2,2-dinitropentyl-5,5,6,6-tetrafluorohexyl ether; 2,2-dinitrohexyl-7,7,8,8-tetrafluorooctyl ether and 2-nitrobutyl-4,4-dimethyl-6,6,7,7-tetrafluoroheptyl ether.

The novel ether compounds in the above formula are prepared in accordance with the following general reactions:

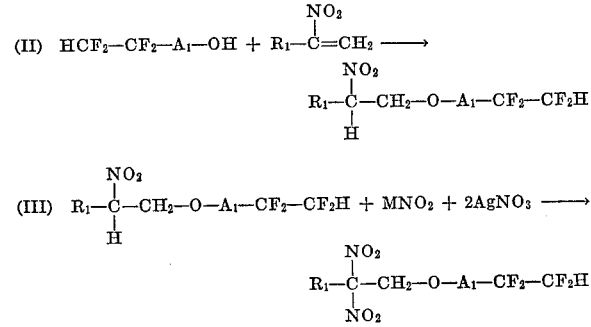

wherein $A_1$ and $R_1$ are as defined above and M is an alkali or alkaline earth metal such as sodium, potassium, lithium, or calcium.

Suitable fluoro alcohol reactants for use in Reaction II include 2,2,3,3-tetrafluoro propanol; 3,3,4,4-tetrafluoro butanol; 5,5,6,6-tetrafluoro hexanol and 4-methyl 7,7,8,8-tetrafluoro octanol.

Typical 2-nitroolefins for use in Reaction II include 2-nitropropene, 2-nitrobutene, 2-nitrohexene and 2-nitrodecene.

In Reaction III, various alkali and alkaline earth metal nitrites such as sodium nitrite, potassium nitrite, strontium nitrite and calcium nitrite may be used.

The above reactions are conveniently carried out in any inert polar or non-polar solvent in which the reactants are soluble, i.e., water, methanol, ethanol, etc. The proportions of the reactants employed in the reaction are not critical. Normally, stoichiometrically equivalent amounts are used since this results in the most economical utilization of the reactants. Thus, in Reaction III, normally the mole ratio of silver nitrate to alkali or alkaline earth metal nitrite to the ether is about 2/1/1. The reaction temperature should normally be sufficiently high so that the reactants will dissolve to a substantial degree in the reaction medium, but in any event, the reaction temperature should be below the composition temperature of the reactant. Normally, the reaction is conducted at a temperature between about −20° C. and about +75° C. The most preferred temperature is from about −10° C. to about +20° C. Pressure is not critical in this reaction. Therefore, while any pressure can be used, the reaction is normally run under atmospheric pressure.

The Reactions II and III above are preferably, although not necessarily, carried out in the presence of a basic catalyst such as sodium hydroxide or potassium hydroxide.

Agitation of the reactants such as by a mechanical stirrer, while desirable in that it increases the reaction rate, is not necessary. The novel compounds of this invention may be isolated in conventional manner such as by extraction, distillation and/or filtration.

To more clearly illustrate the invention, the following examples are presented. It is to be understood, however, that these examples are intended merely as an illustrative embodiment of the invention. In the examples, the percentages are by weight unless otherwise indicated.

EXAMPLE I

Preparation of 2-nitropropyl 2,2,3,3-tetrafluoropropyl ether

To a solution of 13.2 grams of 2,2,3,3-tetrafluoro-1-propanol was added 4.0 grams of sodium hydroxide and 150 ml. of water. To this solution was then added 8.7 grams of 2-nitropropene while maintaining the temperature of the solution at from 0 to 10° C. Stirring was continued for 15 minutes. The solution was then extracted with diethyl ether and dried to give 11.5 grams of a faint green yellow liquid which had a boiling point of 72° C./1 mm. and was found to be 2-nitropropyl 2,2,3,3-tetrafluoropropyl ether.

*Analysis.*—Calc'd for $C_6H_9F_4NO_3$: C, 32.88; H, 4.14; N, 6.39. Found: C, 33.26; H, 4.33; N, 6.35.

When the above procedure was repeated using 3,3,4,4-tetrafluoro-1-butanol in lieu of 2,2,3,3-tetrafluoro-1-propanol and 2-nitrohexene in place of 2-nitropropene, 2-nitrohexyl 3,3,4,4-tetrafluorobutyl ether is obtained.

EXAMPLE II

Preparation of 2,2-dinitropropyl 2,2,3,3-tetrafluoropropyl ether

To eleven grams of 2-nitropropyl 2,2,3,3-tetrafluoro propyl ether prepared according to Example I, above was added 2.01 grams sodium hydroxide, 3.47 grams sodium nitrite and 17.10 grams of silver nitrate. These materials were stirred for about 2 hours while maintaining the temperature at about 20° C. The solution was then extracted with diethyl ether to give 4.1 grams of 2,2-dinitropropyl 2,2,3,3-tetrafluoro ether which was a yellow liquid having a boiling point of 76° C./0.25 mm.

*Analysis.*—Calc'd for $C_6H_8F_4N_2O_5$: C, 27.28; H, 3.05; N, 10.61. Found: C, 27.85; H, 3.21; N, 10.03.

When 2-nitrohexyl 3,3,4,4-tetrafluorobutyl ether, prepared according to Example I, is used in place of 2-nitropropyl 2,2,3,3-tetrafluoropropyl ether, 2,2-dinitrohexyl 3,3,4,4-tetrafluorobutyl ether is obtained in good yield.

The fluoro nitro ethers of this invention, which contain a plurality of nitro groups, are inherently useful as high explosives. These compounds can also be used in any conventional explosive missile, projectile, rocket or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

The novel ethers of this invention are also useful as fungicides and as plasticizers for solid rocket propellants.

This example describes a particular method of preparing a novel propellant composition containing 2,2-dinitropropyl-2,2,3,3-tetrafluoropropyl ether as one of the plasticizer ingredients.

EXAMPLE VI

| Ingredient: | Weight percent |
|---|---|
| Ammonium perchlorate | 65.00 |
| Aluminum | 13.00 |
| Copper chromite | 0.50 |
| Phenyl betanaphthylamine | 0.20 |
| Ferric acetylacetonate | 0.08 |
| Glycerol monoricinoleate | 1.08 |
| Polypropylene glycol (M.W.=2000) | 13.76 |
| Dioctyl azelate | 4.00 |
| 2,2-dinitropropyl-2,2,3,3-tetrafluoropropyl ether | 0.20 |
| Lecithin | 0.20 |
| Tolylene diisocyanate | 1.98 |
| | 100.00 |

The aluminum powder is stirred into about ⅓ of the required volume of polypropylene glycol and glycerol monoricinoleate. The mixture is prepared in a stainless steel container, using a copper-beryllium spatula. Mixing is continued for about ten minutes.

The aluminum slurry is added to a conventional mixer equipped with facilities for heating, cooling, and vacuumizing the propellant mix. The walls of the aluminum slurry container are scraped thoroughly. The container is rinsed with ½ of the required volume of dioctyl azelate and the rinses are added to the mixer. The remaining polypropylene glycol is added to the mixer. The 2,2-dinitropropyl-2,2,3,3-tetrafluoropropyl ether was mixed with the remaining dioctyl azelate until homogeneous and the solution is then added to the mixer.

With the mixer off, the ferric acetylacetonate, phenylbetanaphthylamine, and lecithin are added through a 40-mesh screen. The copper chromite is added to the mixer.

The mixer is covered and mixed by remote control for 15 minutes under 26 to 28 inches of vacuum, after which it is stopped and the vacuum released with dry nitrogen. The cover is removed from the mixer and the oxidizer is added by remote control with the mixer blades in motion.

After all of the oxidizer has been added, the mixer is stopped and scraped down. The propellant mass is mixed for 15 minutes at 70° F. under 26 inches vacuum by remote control. The mixer is stopped and the vacuum released with dry nitrogen. The tolylene diisocyanate is added, after which the mass is mixed for ten minutes at 70° F. and 26 inches of vacuum by remote control. The vacuum is then released with dry nitrogen and the mixture is cast.

It will be understood that various modifications may be made in this invention without departing from the spirit thereof or the scope of the appended claims.

I claim:
1. Compounds of the formula

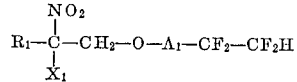

wherein $A_1$ is lower alkylene, $R_1$ is lower alkyl, and $X_1$ is selected from the group consisting of nitro and hydrogen.

2. The compound 2-nitropropyl 2,2,3,3-tetrafluoropropyl ether.

3. The compound 2,2-dinitropropyl 2,2,3,3-tetrafluoropropyl ether.

4. The process of preparing compounds of the formula

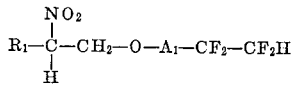

which comprises reacting in an inert solvent a nitroolefin compound of the formula

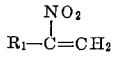

with a fluoroalcohol of the formula $$HCF_2-CF_2-A-OH$$

wherein in the above formulae, $R_1$ is lower alkyl and $A_1$ is lower alkylene.

5. The process of claim 4 wherein the reaction is carried out at atmospheric pressure and at a temperature of from about −20° C. to about +75° C.

6. The process of preparing compounds of the formula

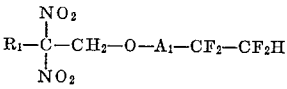

which comprises reacting in an inert solvent a mononitro ether compound of the formula

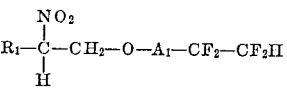

with silver nitrate and a metal nitrite of the formula $MNO_2$, wherein in the above formulae, $R_1$ is lower alkyl, $A_1$ is lower alkylene and M is selected from the group consisting of alkali and alkaline earth metals.

7. The process of claim 6 wherein the mole ratio of the silver nitrate to metal nitrite to mononitro ether compound is 2 to 1 to 1.

8. The method of preparing 2-nitropropyl 2,2,3,3-tetrafluoropropyl ether which comprises reacting 2,2,3,3-tetrafluoro-1-propanol with 2-nitropropene in the presence of an inert solvent.

9. The method of preparing 2,2-dinitropropyl 2,2,3,3-tetrafluoropropyl ether which comprises reacting 2-nitropropyl 2,2,3,3-tetrafluoropropyl ether with silver nitrate and sodium nitrite in the presence of an inert solvent.

References Cited

UNITED STATES PATENTS 3,287,418  11/1966  Hauptschein et al.

LEON ZITVER, *Primary Examiner.*

A. T. MARS, *Assistant Examiner.*